United States Patent [19]

Nagahama et al.

[11] 4,354,450

[45] Oct. 19, 1982

[54] JET LAYER GRANULATOR

[75] Inventors: Takashi Nagahama; Nobuyuki Matsumoto; Masaki Naruo, all of Mobara; Susumu Nioh, Tokyo; Hiroshi Hirayama, Funabashi; Tetsuzo Honda, Funabashi; Yoshinori Sato, Funabashi; Kenji Toyama, Chiba; Gisaburo Shiotu, Kawasaki, all of Japan

[73] Assignees: Toyo Engineering Corporation; Mitsui Toatsu Chemicals, Inc., both of Tokyo, Japan

[21] Appl. No.: 258,846

[22] Filed: Apr. 29, 1981

[30] Foreign Application Priority Data

| May 7, 1980 | [JP] | Japan | 55-60369 |
| May 7, 1980 | [JP] | Japan | 55-60370 |
| Jun. 17, 1980 | [JP] | Japan | 55-82000 |
| Jun. 17, 1980 | [JP] | Japan | 55-82001 |
| Aug. 1, 1980 | [JP] | Japan | 55-106304 |
| Aug. 1, 1980 | [JP] | Japan | 55-106305 |

[51] Int. Cl.³ .................. B05B 17/00; B05C 5/00; B05D 7/00
[52] U.S. Cl. .................. 118/303; 23/313 R; 118/DIG. 5; 118/429; 159/4 E; 159/48 R; 264/7; 422/139; 427/213
[58] Field of Search .................. 118/303, DIG. 5, 429; 427/213; 23/313 R; 159/4 E, 48 R; 264/7; 422/139

[56] References Cited

U.S. PATENT DOCUMENTS

| 3,231,413 | 1/1966 | Berquin | 118/303 X |
| 3,237,596 | 3/1966 | Grass et al. | 118/303 X |
| 3,605,685 | 9/1971 | West et al. | 118/303 X |
| 4,141,316 | 2/1979 | Grun | 118/303 |

Primary Examiner—Michael R. Lusignan
Attorney, Agent, or Firm—Blanchard, Flynn, Thiel, Boutell & Tanis

[57] ABSTRACT

In a granulator of the jet layer type, all the liquid jetting openings are located in a passage for a gas jetted from the gas jetting opening and each liquid jetting opening is located at a position higher than the gas jetting opening by a vertical distance smaller than the inner diameter of the gas jetting opening. The granulator may have an additional device such as an excess size-having particle-collecting means, a five particle treating means, a rectifying pipe member, a fuffer member and a hindrance and breakage member.

17 Claims, 23 Drawing Figures

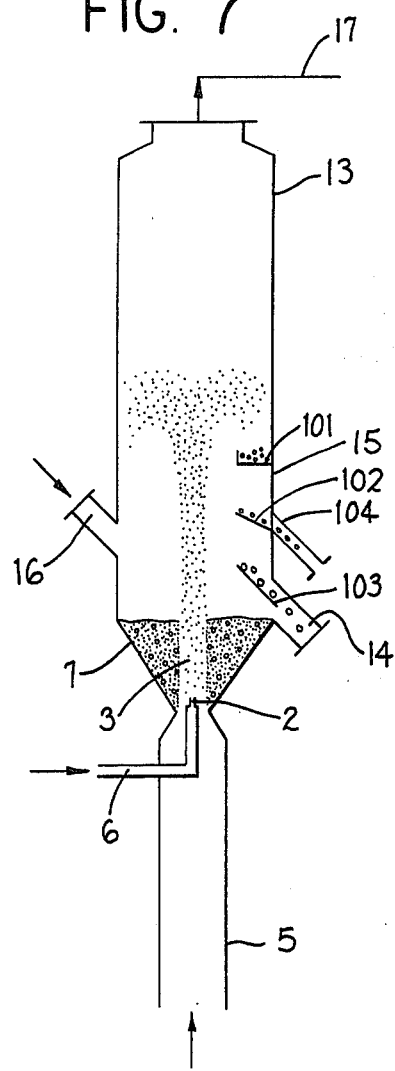

JET LAYER GRANULATOR

The present invention relates to an improvement in the jet layer granulator. More particularly, the present invention relates to a structure of a gas jetting opening and a surrounding portion thereof in a jet layer granulator comprising a granulator proper including an upper portion consisting of a substantially vertical, hollow cylindrical body and a lower portion including a bottom of an inverted frustoconical shape, in which a gas is blown into the granulator proper from the lower end of the inverted frustoconical bottom to blow up solid particles deposited on the inverted frustoconical bottom and thereby form a jet layer of the particles, a liquid is simultaneously jetted upward into the jet stream from a liquid jetting opening to make liquid drops adhere to the respective solid particles, and the liquid-adhering particles are cooled and solidified or the volatile component in the liquid is evaporated and removed while the liquid-adhering particles rise in the jet layer and then fall down, whereby the respective particles are coarsened or coated. The primary object of the present invention is to improve the efficiency of the jet layer granulator and stabilize the operation.

The outline of the jet layer type granulation method has already been known from, for example, Japanese Patent Publication No. 47230/78 and Japanese Patent Application Laid-Open Specification No. 92715/78. In order to perform the operation at a high efficiency in such jet layer type granulation method, it is important that liquid drops formed by jetting of the liquid should be caused to adhere to solid particles in the jet layer at a high efficiency and that a stable jet layer having a high particle content should be present. As the result of experiments and researches conducted for a long period, we found that there is an interrelation between effective adhesion of liquid drops to solid particles in the jet layer and stable formation of a jet layer having a high particle content and that only when the structure surrounding the lower end portion of the inverted frustoconical bottom satisfies certain specific conditions, can such effective adhesion and stable formation be attained. None of the prior art references report or teach in detail the structure of the lower end portion of the inverted frustoconical bottom, and the above-mentioned jet layer type granulation method cannot be practised at a high efficiency according to any of the conventional techniques.

BRIEF DESCRIPTION OF THE DRAWINGS

FIG. 7 is a longitudinal sectional view diagrammatically illustrating the jet layer granulator according to the additional invention (I).

The present invention will first be described with reference to the mutual positional relationship between the gas jetting opening and the liquid jetting opening. FIGS. 1 and 2 are longitudinal sectional views showing examples of the structure of the portion surrounding the lower end of an inverted frustoconical bottom 7 of the jet layer granulator. In FIGS. 1 and 2, reference numerals 5 and 1 represent a gas introduction pipe and a gas jetting opening, respectively. A gas blown into the upper granulator from the gas jetting opening 1 at a high speed at least about 10 m/sec entrains therein solid particles present in the lower portion of a layer 4 of accumulated and deposited particles, and the particles rise substantially along lines 10 to form a jet layer 3 and the solid particles are thus blown upwardly. The solid particles which have passed through the jet layer 3 and have been blown farther upwardly reach an upper space (not shown) where the speed of the gas is reduced and they are then allowed to fall down on the top face of the accumulated particle layer 4. If the gas is continuously blown from the gas jetting opening 1, the jet layer is maintained and the particles which have fallen on the top face of the accumulated particle layer 4 are gradually shifted downward and finally are blown upwardly again to form the jet layer. Accordingly, the particles are thus circulated in the granulator. In the case where a stable jet layer 3 is formed, the jet layer 3 is surrounded by a wall W1 defined by the deposited particle layer 4, said wall having a diameter determined substantially by the flow rate of the blown gas. This wall W1 is expanded as W2 in the vicinity of the gas jetting opening. The wall W2 is a very indefinite wall and is regarded as the boundary surface where the accumulated particle layer 4 is being destroyed and the particles are flowing into the jet layer 3. It is considered that the majority of the solid particles to be supplied to the jet layer 3 are supplied from the wall W2, although the solid particles also are supplied from the wall W1 to some extent. Although the interface between the walls W1 and W2 is indefinite, the interface is ordinarily present at a high position which is higher than the gas jetting opening by a distance about two times the diameter of the gas jetting opening 1.

In the actual granulation operation, a liquid jetting opening 2 is disposed in the above-mentioned jet layer to jet a liquid and cause liquid drops to fly in directions indicated by the lines 11, and it is important that the thus jetted liquid drops should be caused to adhere to solid particles which are flowing into the jet layer or rising in the jet layer. If the liquid jetting opening 2 is disposed at a relatively higher position in the gas jetting opening 1, since the solid particles rising in the space higher than the position of the liquid jetting opening already have a rising velocity close to the rising velocity of the high speed gas stream, the speed difference between the liquid drops and the solid particles is very small and the ratio of adhesion of the liquid drops to the solid particles is reduced. In this case, the liquid drops which have not adhered to the solid particles are directly dried or cooled and solidified, and they are wastefully discharged to the outside of the granulator together with the gas stream or they are accumulated in the granulator in the form of fine dusts to drastically reduce the granulation efficiency. Moreover, parts of the liquid drops adhere directly to the wall W1 and agglomerate thereon to form large agglomerates. In order to avoid these disadvantages, it is preferred that the liquid jetting opening 2 be disposed in the vicinity of the gas jetting opening 1. However, it is not true that if only the liquid jetting opening 2 is disposed in the vicinity of the gas jetting opening 1, other requirements need not be satisfied. A slight difference of the position for location of the liquid jetting opening 2 results in significant differences of the liquid drop adhesion ratio and operation stability. FIG. 1 shows an embodiment in which the liquid jetting opening 2 is located at a position slightly higher than the gas jetting opening 1, and FIG. 2 shows an embodiment in which the liquid jetting opening 2 is located at a position slightly lower than the gas jetting opening 1. When the liquid jetting opening 2 is located below the gas jetting opening 1 as shown in FIG. 2, if the expansion angle A of the jetted liquid (the vertical angle of the inverted conical shape defined by the flow lines 11 of liquid drops, which will hereinafter be referred to as "jetting vertical angle") is increased, liquid drops adhere to the solid particles flowing into the high speed gas stream from the lowermost portion of the wall W2, with the result that the portion of the inverted frustoconical bottom 7, which is close to the gas jetting opening, is wetted with the liquid and coagulation is caused by cooling solidification or drying solidification, and this coagulation is developed with the passing of time and in an extreme case, the coagulation becomes present even at the inner face of the gas introduction pipe 5 located below the gas jetting opening 1. Finally, continuation of the normal operation becomes impossible because of this disadvantage. In contrast, if the jetting vertical angle A is decreased, the above disadvantage is not brought about, but the positions where the solid particles meet the liquid drops rise beyond the meeting position in the embodiment shown in FIG. 2 and the differences of the moving direction and speed between the liquid drops and the solid particles become small. Accordingly, the ratio of adhesion of the liquid drops to the solid particles is extremely reduced and the above-mentioned disadvantages such as reduction of the granulation capacity and formation of large agglomerates are brought about. When the liquid jetting opening 2 is disposed at the same level as that of the gas jetting opening 1 as shown in FIG. 1 or is disposed as a level slightly higher than the level of the gas jetting opening, the liquid is flowing into the high speed gas stream from a portion corresponding to about ⅔ of the height of the wall W2 unless the jetting vertical angle A is extremely increased, and the moving speed of the liquid drops is still low and the liquid drops are caused to adhere at a high efficiency to the solid particles moving substantially toward the liquid jetting opening. Accordingly, the above-mentioned disadvantages can conveniently be avoided. The basic characteristic feature of the present invention resides in that the liquid jetting opening 2 is located slightly above the gas jetting opening 1. The upper limit of the height of the liquid jetting opening 2 is such that the liquid jetting opening is located at a position higher than the level of the gas jetting opening 1 by a distance substantially equal to the diameter of the gas jetting opening 1. If the level of the liquid jetting opening 2 exceeds this upper limit, occurrence of the above-mentioned disadvantages cannot be avoided. Also in this case, however, if the jetting vertical angle A is too large or too small, the above disadvantages are brought about. It is therefore preferred that the jetting vertical angle be in the range of from 20° to 120°. Furthermore, it is especially preferred that no liquid be jetted in the region where the jetting vertical angle is smaller than 20°. The inverted conical shaped defined by the flow lines 11 of liquid drops is not limited to an ordinary inverted conical shape, but an inverted pyramidal shape or the like may be adopted.

Figure 1:
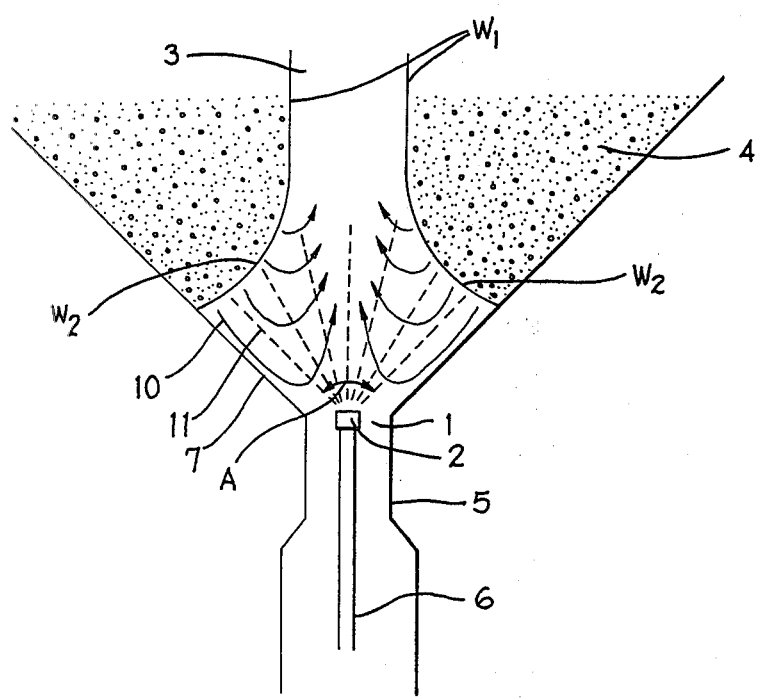
FIGS. 1, 2 and 3 are longitudinal sectional views illustrating examples of the bottom structure of the granulator.
Figure 2:
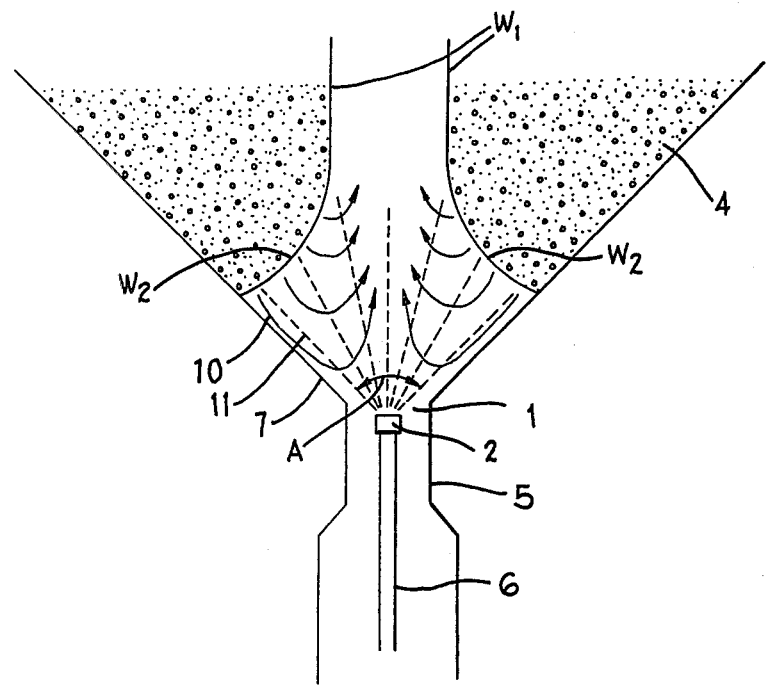

The foregoing explanation of the relative height of the liquid jetting opening 2 to the gas jetting opening 1 and the jetting vertical angle A has been made with reference to the embodiment where one liquid jetting opening is provided. In the granulator of the present invention, two or more of liquid jetting openings may be provided. When two or more of liquid jetting openings are used, the relative height of each liquid jetting opening to the gas jetting opening and the jetting vertical angle of each liquid jetting opening are the same as described hereinbefore, and arrangement of these liquid jetting nozzles is not particularly critical provided that the liquid jetting openings are arranged on the peripheral edge of the flow line of the gas jetted from the gas jetting opening or inside said peripheral edge. However, in this case, it must be taken into account that liquid jetting nozzles are not wetted with liquid drops jetted from other liquid jetting openings. As means for realizing this feature, there may be adopted special jet nozzles in which the liquid jetting direction is not symmetrical with the central axis of the jetting vertical angle but the liquid is jetted only in a desired direction.

In the jet layer granulation method, continuation of a stable operation is possible only by improving the ratio of adhesion of liquid drops to solid particles in the above-mentioned manner. The other indispensable requirement is that the ratio of the quantity of the solid particles flowing into the high speed gas stream from the wall W2 to the quantity of the jetted liquid should be adjusted to an appropriate value and this value should be maintained stably. For example, when the quantity of solid particles flowing into the high speed gas stream from the wall W2 under appropriate gas jetting conditions is too large, the gas jetting opening 1 is clogged and blow-in of the gas becomes impossible, with the result that the jet layer disappears and the periphery of the liquid jetting opening is jammed with the layer of solid particles, in which the liquid is jetted and solidified. Therefore, continuation of the operation becomes impossible. In contrast, if the quantity of solid particles flowing in the high speed gas stream is too small, parts of excessively supplied liquid drops exert a function of coagulating the solid particles on the wall W2 to further reduce the quantity of the solid particles in the jet layer and worsen the adhesion ratio of the liquid drops. Furthermore, parts of excessively supplied liquid drops are converted to fine dusts and wastefully discharged or accumulated in the granulator, as pointed out hereinbefore. If the amount of the jetted liquid is reduced while continuing the operation so as to avoid the above disadvantage, the liquid is not finely divided to fine particles having a desirable size because of inherent characteristics of the liquid jetting operation, and furthermore, the jetting speed of the liquid drops is reduced and the majority of the liquid drops are carried upward by the high speed gas stream. Accordingly, no good results can be obtained, as in the above-mentioned case.

We made researches in this connection and found that if there is satisfied the condition that the diameter of the crossing line of an imaginary inverted conical face (hereinafter referred to as "imaginary inverted cone") having a central axis common to the central axis of the gas jetting opening, having the lower end agreeing with said gas jetting opening and also having a vertical angle two times as large as the complementary angle of the minimum repose angle of the powder to be granulated, to the inner wall face of the inverted frustoconical bottom of the granulator is 1.25 to 3.0 times as large as the diameter of the gas jetting opening, the quantity of solid particles flowing into the high speed gas stream from the wall W2 is stabilized and a good operation state is produced. This feature will now be described.

When a certain substance is granulated by the jet layer granulator, the driving force of introducing solid particles into the high speed gas stream from the wall W2 is in principle the gravity acting on the accumulated particle layer, and this driving force is mainly influenced by such factors as (1) the height of the accumulated particle layer 4, (2) the internal friction determined by the particle structure conditions (hereinafter referred to as "particle conditions") such as the average particle size and particle size distribution of the solid particles constituting the accumulated particle layer 4, the shape and surface smoothness of the respective particles and the distribution states of the shape and surface smoothness among the particles, (3) the amplitude of the friction (hereinafter referred to as "particle friction") caused when some particles slip and move on stationary particles, and (4) the friction (hereinafter referred to as "metal friction") caused when particles slip, roll or move on the surface of a stationary metal. It is ordinarily impossible to control these factors, except the height of the accumulated particle layer, during the operation.

Figure 3:
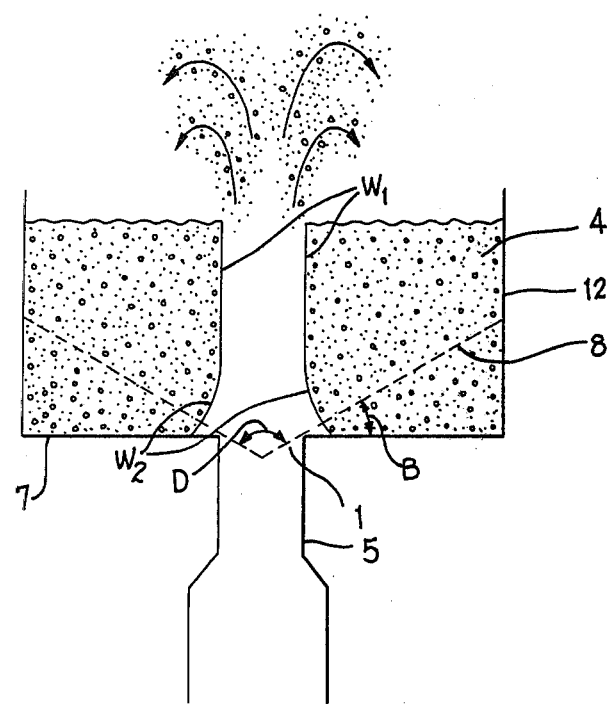

As shown in FIG. 3, a cylindrical side wall 12 and a horizontal bottom plate 7 are used, and a gas introduction pipe 5 is connected to the center of the bottom plate 7 and a gas jetting opening is formed at the position of the top end 1 thereof. When a jet layer is formed in the granulator having the above structure shown in FIG. 3, the formed jet layer is very stable and clogging of the gas jetting opening 1 does not occur. However, in this granulator, the quantity of solid particles entrained in the high speed gas stream and blown upwardly as the jet layer is much smaller than in the granulator having an inverted frustoconical bottom of a small vertical angle. It is believed that the reason is as follows.

The particles entrained in the high speed gas stream mainly from the wall W2 to form a jet layer move along an imaginary inverted conical face 8 having a central axis common to the central axis of the gas introduction pipe 5, having the lower end face agreeing with the gas jetting opening 1 and also having a vertical angle D two times the repose angle B of powder (hereinafter referred to as "particles") to be granulated in the accumulated particle layer 4 and these particles flow into the high speed gas stream while slipping on stationary particles located below said imaginary inverted conical face. The particle friction caused at this point between the moving particles and the stationary particles is considerably large, and even if the height of the accumulated particle layer 4 is the same as in the granulator having an inverted frustoconical bottom of a small vertical angle, in the granulator shown in FIG. 3, the amplitude of this friction is a main factor determining the quantity of the solid particles flowing into the high speed gas stream and this quantity is very small. In short, the driving force of introduction of the particles is insufficient.

When the jet stream is used for granulation as in the present invention, the above-mentioned particle conditions change with the passing of time because the particles of the accumulated particle layer 4 are in the form of a mixture of a great variety of particles differing in the shape, dimension and surface smoothness as seed crystals for the granulation. With changes of the particle conditions, also the internal friction and the repose angle B change. Mainly, changes of these two factors result in a change of the driving force for introducing the particles into the high speed gas stream. In the case as shown in FIG. 3, even if the jet layer is apparently stable, the content of particles in the jet layer changes.

Accordingly, if the horizontal bottom plate 7 shown in FIG. 3 is replaced by an inverted frustoconical bottom agreeing with the imaginary inverted conical face 8, since the friction is changed from the particle friction to the metal friction which is smaller than the particle friction, the driving force for introducing particles into the high speed gas stream is increased at a certain stage of the movement of the particles, and the quantity of the particles flowing into the high speed gas stream is increased to some extent. However, the quantity of the particles contained in the jet stream is still insufficient and variations of the quantity of the particles flowing into the high speed gas stream occur, with the result that no satisfactory state can be obtained. If the horizontal bottom plate 7 is replaced by an inverted frustoconical bottom having a gradient corresponding to the maximum repose angle or a steeper gradient, the driving force is increased and the quantity of particles flowing into the high speed gas stream is extremely increased, but the quantity of the particles flowing into the high speed gas stream becomes excessive when the repose angle becomes small, to cause a phenomenon of clogging of the gas jetting opening, and the jet layer becomes unstable. In this case, it is very difficult to stabilize the jet layer by adjusting the inclination of the bottom surface while continuing the operation.

According to the present invention, as means for obtaining a stable jet layer while maintaining a large quantity of particles in the jet layer, there is adopted a method in which the particle friction is utilized in the vicinity of the gas jetting opening to prevent excessive flow-in of particles and the metal friction which is smaller than the particle friction is utilized in the portion spaced from the gas jetting opening to prevent insufficiency of the driving force caused when only the particle friction is utilized.

Figure 4:
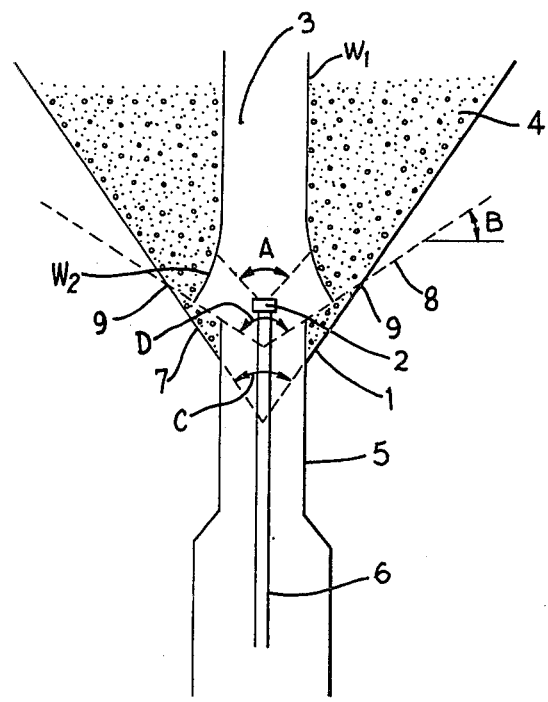
FIG. 4 is a longitudinal sectional view illustrating one embodiment of the present invention.

An embodiment of this method for utilizing the jet layer according to the present invention will now be described with reference to FIG. 4. Referring to FIG. 4, a liquid jetting opening 2 is disposed at a level slightly higher than the level of a gas jetting opening 1 as in the above-mentioned embodiment. The gas jetting opening 1 is located at the top end of a gas introduction pipe 5 inserted into an inverted frustoconical bottom 7 of the granulator from the lower end of the inverted frustoconical bottom 7. If the above-mentioned structure is adopted for the portion surrounding the lower end of the inverted frustoconical bottom of the granulator, particles in an accumulated particle layer 4, which are flowing toward the gas jetting opening 1 from the wall W2, move along an imaginary conical face 8 in the vicinity of the gas jetting opening 1 according to the particle friction mode, but in the portion spaced from the gas jetting opening 1, the particles move on the surface of the inverted frustoconical bottom 7 having a vertical angle C smaller than the vertical angle D of the imaginary inverted cone 8 according to the metal friction mode. More specifically, in the portion closer to the gas jetting opening than the crossing line 9 of the imaginary inverted conical face 8 to the inverted frustoconical bottom 7 (in the portion inside the crossing line 9), particles in the accumulated particle layer 4 slip down on the stationary particles below the imaginary inverted conical face 8 according to the particle friction mode, and in the portion more distant from the gas jetting opening than the crossing line 9 (in the portion outside the crossing line 9), the particles in the accumulated particle layer 4 slip down on the surface of the inverted frustoconical bottom 7 according to the metal friction mode. In other words, the flow-down driving force of the particles slipping down on the side face 7 of the inverted conical frustum having a relatively small vertical angle C on the outside of the crossing line 9 according to the metal friction mode is utilized while controlling this driving force by the particle friction, which is larger than the metal friction, among the particles slipping along the imaginary inverted conical face 7 on the inside of the crossing line. By adoption of this method, the disadvantage of the jet layer shown in FIG. 3, that is, the disadvantage that the quantity of particles contained in the jet layer is too small though the jet layer per se is stable, can effectively be eliminated. Namely, by adoption of the above method, it becomes possible to produce a stable jet layer containing a very large quantity of particles, and even if the liquid jetting opening is disposed at a level slightly higher than the level of the gas jetting opening, all the above-mentioned disadvantages caused by the unstable jet layer can completely be eliminated. Another advantage of the apparatus of this embodiment is that the influences of changes of the repose angle B of particles in the accumulated particle layer 4 can substantially be neglected. More specifically, if the repose angle B of particles in the accumulated particle layer 4 is changed in the vicinity of the bottom having certain structure and dimension, also the crossing line 9 of the imaginary inverted conical face 8 to the bottom 7 is changed, but since the portion inside the crossing line 9, where the particle friction is utilized, is small, even if the flow-in driving force is slightly changed in this portion, the change of the entire driving force is very small and the entire driving force is not substantially influenced by the change of the repose angle because the driving force on the wall surface of the bottom 7 on the outside of the crossing line 9, which occupies the majority of the entire driving force, is maintained at a sufficiently high level.

As will be apparent from the foregoing description, in this jet layer-stabilizing method, if the crossing line 9 is much spaced from the gas jetting opening 1, the content of particles in the jet layer is reduced as illustrated above with reference to FIG. 3, though the jet layer is stabilized, with the result that the quantity of the liquid to be jetted cannot be increased and the operation efficiency of the granulator is inevitably reduced. In contrast, if the crossing line 9 is very close to the upper end edge of the gas jetting opening 1, the above-mentioned excessive flow-in phenomenon of particles takes place and the jet layer becomes unstable. From the results of experiments made by us, it has been confirmed that it is preferred that the diameter of this crossing line 9 be 1.25 to 3.0 times the diameter of the gas jetting opening. The value of the diameter of the crossing line 9 to be selected within the above-mentioned range is changed according to the properties of the particles in the accumulated particle layer 4. Ordinarily, a smaller value is selected for particles having a low flowability as powder, and a larger value is chosen for particles having a high flowability. In order to maintain a sufficient flow-in driving force of particles in the bottom portion outside the crossing line 9, it is preferred that the vertical angle C of the inverted frustoconical bottom 7 be smaller than the value two times the complementary angle of the maximum repose angle of particles in the accumulated particle layer 4. However, if this vertical angle C is too small, when particles of the accumulated particle layer move downward, they undergo a compressive action and the flowability as the powder is often reduced. Accordingly, no good results can be obtained if the vertical angle C is too small. From the results of experiments made by us on various powders, it has been confirmed that it is preferred that the vertical angle C be in the range of from 40° to 120°. In not only the embodiment shown in FIG. 4 but also other embodiments of the present invention, the inner diameter of the gas jetting opening 1 need not be the same as the inner diameter of the gas introduction pipe 5, but the inner diameter of the gas jetting opening 1 may be smaller or larger than the inner diameter of the gas introduction pipe 5 and if the above-mentioned conditions preferred for carrying out the present invention are satisfied, it is indispensable that the gas should be jetted at a speed sufficient to form a jet layer. It is preferred that the gas jetting speed be at least 10 m/sec, especially 25 to 30 m/sec. Air is most convenient as the gas to be jetted, but an inert gas such as nitrogen or a combustion gas maintained at a desirable temperature may be used according to need. It is ordinarily sufficient if one liquid jetting opening or nozzle is disposed slightly above the gas jetting opening. In a large-scale granulator or the like, however, two or more of liquid jetting openings may be formed.

Figure 5:
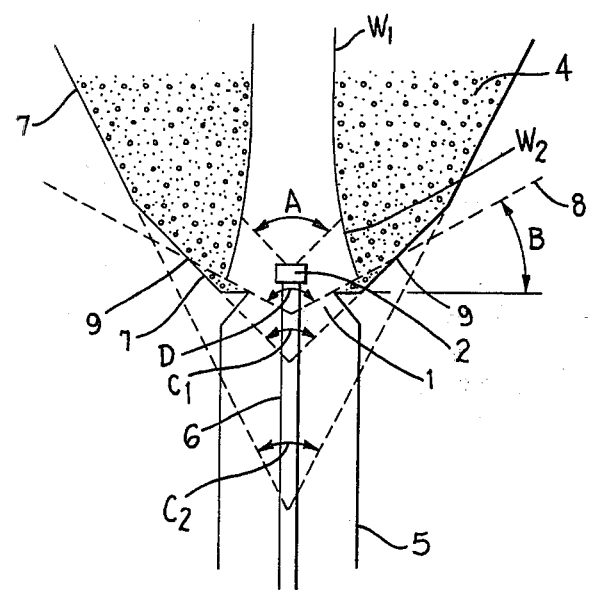
FIG. 5 is a longitudinal sectional view illustrating another embodiment of the present invention.
Figure 6:
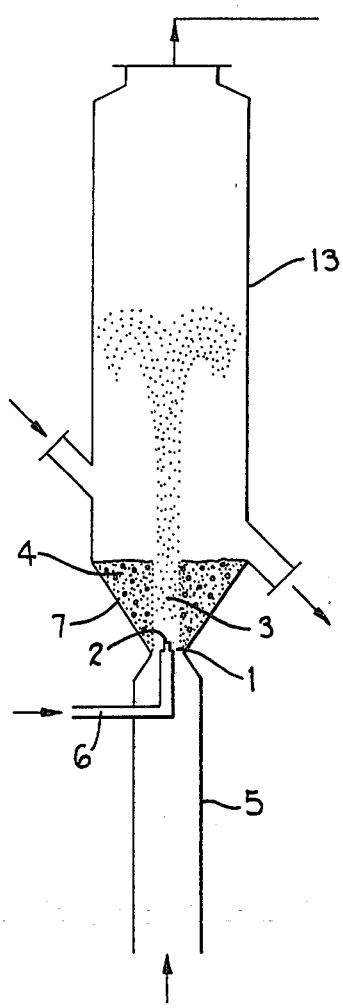
FIG. 6 is a diagram showing the entire structure of the granulator, which illustrates the principle of the jet layer granulation method.
Figure 8A:
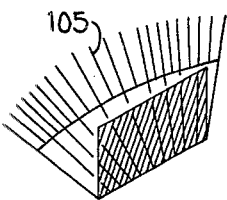
FIGS. 8 and 9 show several examples of collecting means constituting the characteristic feature of the jet layer granulator.
Figure 8B:
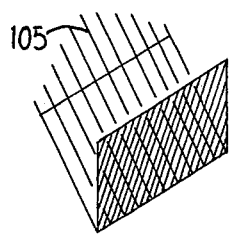
Figure 8C:
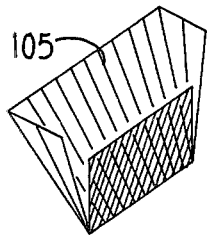
Figure 8D:
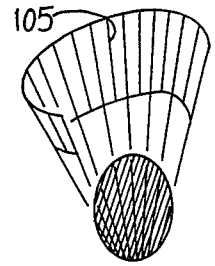
Figure 8E:
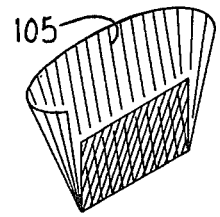

Another embodiment of the present invention is illustrated in FIG. 5. In the embodiment shown in FIG. 5, the area of the lower surface of the granulator bottom consisting of a double inverted conical frustum 7 having two vertical angles C1 and C2 is larger than the area of a gas jetting opening 1, the gas jetting opening is not intruded into the inverted frustoconical bottom, and the diameter of the crossing point of this inverted conical frustrum to an imaginary inverted frustoconical face 8 is 1.25 to 3 times the diameter of the gas jetting opening 1. In this embodiment, the diameter of the gas jetting opening 1 is smaller than the diameter of a gas introduction pipe 5. Also in the embodiment shown in FIG. 5, the intended object of the present invention can similarly be attained as in the embodiment shown in FIG. 4.

As will be apparent from the foregoing description, according to the granulator of the present invention, a large quantity of a liquid is jetted from the liquid jetting opening 2 disposed slightly above the gas jetting opening 1 and drops of the jetted liquid are entrained in a stream of a gas blown at a high speed into the granulator from the gas jetting opening 1, and the liquid drops are caused to adhere at a high efficiency to a large quantity of particles which are flowing from the accumulated particle layer 4 with a high quantitative stability and while the liquid drop-adhering particles then rise in the jet layer and finally drop down, the particles receive a cooling solidification or drying solidification action, whereby the seed particles are coated and coarsened. When this apparatus of the present invention is used, even if the scale is small, a large quantity of particles can be treated at a much higher efficiency than in the conventional known granulators. Accordingly, the apparatus of the present invention is advantageously used for coarsening a large quantity of seed particles of a granular product such as urea, a chemical fertilizer or sulfur by causing a solution or melt containing the same chemical substance as that of the seed particles to adhere to the seed particles and solidifying the applied liquid by cooling or drying or for covering seed particles by causing a melt or solution containing at least a chemical substance different from that of the seed particles and solidifying the applied liquid by cooling or drying. When the apparatus of the present invention is used for these purposes, if solidification is effected by cooling, a low-temperature gas stream is adopted, and if solidification is effected by drying, a high-temperature gas stream is adopted. In each case, the operation efficiency of the apparatus is remarkably enhanced.

The jet layer granulator according to the invention which has been defined as above may contain various preferable features such as illustrated below (I) to (V).

(I) Excess size-having particle-collecting means

In the jet layer granulator, particles in a particle layer in a vessel having an inverted frustoconical shape are fluidized by a high speed gas fed under pressure through a gas feed pipe opened to the bottom of the vessel, a liquid substance capable of being solidified by cooling, heating or drying is sprayed to the particles being fluidized to cause the sprayed liquid substance to adhere to the particles, and the particles are coarsened by solidification of the adhering liquid substance. Particles having a relatively large particle size can be prepared according to this granulator. It has been found that in order to operate this granulator at a high efficiency stably, it is important that excessive size particles or agglomerate particles, which drastically inhibit the stable state of the jet layer and extinguish, in an extreme case, the jet layer whereby to stop the operation, should be prevented from being resident in the granulator as much as possible, and that it also is important that formed excessive size particles should be separated from the particle layer and discharged outside the granulator as promptly as possible.

In the above-mentioned jet layer granulator, respective particles in the particle layer, which act as seeds of product particles, are different from one another with respect to the residence time in the granulator, and a particle size distribution is brought about by this difference of the residence time. Particles having a long residence time flow into the jet layer many times, and therefore, the amount of the liquid substance adhering and solidified on these particles is increased and the particles are coarsened to a larger extent. Coarsening is excessively advanced and abnormally coarsened particles are inevitably formed in certain quantities. It becomes difficult for abnormally coarsened particles to be discharged together with product particles and therefore, the remaining coarsened particles are further coarsened. This phenomenon is prominent when the particle size region of the product is set on a larger particle size side. More specifically, if the particle size region of the product is set on a larger particle size side, residence times of respective particles in the particle layer should inevitably be prolonged. Accordingly, the number of particles which are excessively coarsened because of too long residence times is increased.

If means for selectively separating excessive size particles is not provided in the granulator of this type, excessive size particles arrive at the bottom of the granulator, that is, in the vicinity of the lower end of the jet layer, and they are promptly coarsened and they are finally converted to large agglomerates. These large agglomerates are stagnant in the vicinity of the top end of the gas feed pipe for feeding a gas for formation of a jet layer, and finally, the jet layer is extinguished.

In the apparatus not provided with means for selectively separating excessive size particles, formation of excessive size particles cannot be avoided without adoption of means for shortening the residence time of particles in the apparatus and discharging product particles containing large quantities of particles having too small a particle size. Accordingly, the quantities of particles having too small a size, which are discharged together with product particles and separated therefrom and are returned to the apparatus, are increased, while the quantities of product particles having a desirable particle size distribution are decreased.

If there are provided means capable of eliminating the foregoing disadvantages caused by formation of excessive size particles, that is, unstability of the jet layer and shortening of the residence time, it will be possible to bring the particle size distribution in the granulator close to a desirable particle size distribution, increase the yields of product particles and enhance the granulating capacity of the apparatus. Based on this idea, we made experiments, and we have now completed the additional invention (I) and therefore provided a jet layer granulator in which particles having a particle size exceeding the intended particle size region of product particles or a particle size larger by a certain value than the intended particle size region of product particles are selectively collected in the granulator and discharged outside the granulator, these excessive size particles are prevented from flowing into the jet layer, formation of large agglomerates rendering the jet layer unstable is prevented to make it possible to operate the granulator stably for a long time, and the particle size distribution of particles in the granulator is brought close to the intended particle size distribution of product particles, whereby yields of product particles can effectively be increased.

From the results of experiments made by us, it has been found that the above purpose can be attained by adoption of simple means.

It is preferred in the invention that means for selectively collecting excessive size particles is disposed in a space of a granulation zone and the granulator is operated so that the particle size distribution in particles in the granulation zone is brought close to the desirable particle size distribution of the product. More particularly, comb-like or lattice-like, excessive size particle collecting means for selectively collecting particles having an excessive particle size from the particles fluidized is disposed on the surface of an inner wall in the upper portion of the granulator at a position higher than the lower edge of an opening for discharge of product particles.

The means for discharging excessive size particles is attached to comb-like or lattice-like, excessive size particle collecting means.

Excessive size particles tend to gather at the center of the upper portion of the particle layer. Accordingly, prior to formation of large agglomerates by abnormal coarsening, excessive size particles flow into the jet layer very frequently and are jetted upward and scattered very frequently, and therefore, at the initial stage of formation of excessive size particles such excessive size particles can effectively be collected even at a position higher than the position of the portion for discharging product particles. This fact has been confirmed from the results of experiments made by us.

It is believed that the above-mentioned fact is due to the fact that since excessive size particles at the initial stage of formation of excessive size particles have an inertia larger than those of product particles and particles smaller than the product particles, the distance of scattering of the excessive size particles after separation from the jet layer is much larger and the possibility of flowing into the jet layer is greater.

Excessive size particle collecting means according to the present invention is disposed on the inner wall of the granulator so that the collecting means projects toward the center of the granulator, and this collecting means has a comb-like or lattice-like structure consisting of a plurality of rod members. These rod members are arranged inwardly in the granulator, vertically along the inner wall surface of the granulator and downwardly toward the inner wall of the granulator.

The rod members projecting toward the center from the inner wall of the granulator may be linear, bent upward or curved. The minimum distance between two adjacent rod members projecting inward in the granulator is larger than the maximum particle size of product particles or is larger by a certain value than the maximum particle size of product particles.

The reason why the minimum distance between two adjacent rod members is larger by a certain value than the maximum particle size is that when incorporation of excessive size particles having a size slightly larger than the maximum size into product particles is allowed, such excessive size particles are prevented from being collected by the collecting means.

The distance between two adjacent rod members may be increased or decreased toward the inner wall of the granulator, or this distance may be kept constant.

The projecting rod members may be supported and fixed by rod members arranged along the inner wall of the granulator and kept in contact with the lower faces of the projecting rod members for the purpose of reinforcement or selection according to need. The length of rod members projecting inward in the granulator is determined according to the inner diameter of the granulator, but in many cases, this length is 100 to 500 mm. The distance between two adjacent projecting rod members is in the range of from 5 to 50 mm.

When the collecting means exerts only functions of collecting excessive size particles and storing them therein while the granulator is operated, it is preferred that the rod members projecting inward in the granulator be disposed horizontally or an upward gradient of up to 30° be given with respect to the inward direction.

In case of collecting means where collected excessive size particles are optionally discharged outside the granulator through a discharge opening formed through the granulator wall, an upward gradient of 30° to 80°, preferably 45° to 70°, is given to the projecting rod members with respect to the inward direction. An opening for discharging a mixture of product particles and smaller particles may be used as the opening for discharging excessive size particles.

The additional invention (I) will now be described with reference to FIGS. 7 to 9.

FIG. 7 is a longitudinally sectional view showing the entire structure of the jet layer granulator.

The granulator 13 shown in FIG. 7 comprises a lower inverted frustoconical portion 7 and an upper cylindrical portion 15, and a gas feed pipe 5 is connected to the bottom of the inverted frustoconical portion 7. A liquid substance feed pipe 6 is disposed in the vicinity of the joint portion between the inverted frustoconical portion and the gas feed pipe so that a liquid substance is jetted and sprayed upward from a nozzle 2 on the top end of the pipe 6.

A product discharge opening 14 is formed in the cylindrical portion 15 in the vicinity of the upper edge of the inverted frustoconical portion 7.

Furthermore, an opening 16 for feeding seed particles acting as nuclei of particles coarsened in the inverted frustoconical portion 7 is disposed in the cylindrical portion 15.

A gas discharge pipe 17 is disposed on the top of the granulator 13.

Excessive size particle collecting means 101, 102 and 103 constituting the characteristic feature of the present invention are disposed on the inner wall of the cylindrical portion 15 at a position higher than the lower edge of the product discharge opening 14. At least one kind of the collecting means 101, 102 and 103 is appropriately chosen and used according to need.

The collecting means 102 has an opening 104 for excessive size particles.

The collecting means 103 is arranged at such a position that the product discharge opening 14 can be used as a passage for discharge of excessive size particles.

In FIG. 7, only collecting means 101 and 102 having longitudinal sections in FIG. 7 are shown, and in the present invention, appropriate numbers of the collecting means 101 and 102 may be disposed on the inner wall of the granulator. Especially, the collecting means 101 may be disposed on the entire circumference of the inner wall of the granulator.

In the granulator 13, a jet layer 3 is formed at the central part of the inverted frustoconical portion 7 by a high speed gas stream fed under pressure through the gas feed pipe 5.

A liquid substance jetted and sprayed from the nozzle 2 adheres to particles moving at a high speed upward in the jet layer 3 and the adhering liquid substance is solidified to coarsen the particles.

The particles which have passed upwardly through the jet layer 3 and been coarsened are separated from the gas stream having a reduced speed in the space of the cylindrical portion 15 and are scattered away, allowed to fall down and returned to the jet layer 3.

Particles in an amount corresponding substantially to the sum of the amount of seed particles fed from the feed opening 16 and the amount of the liquid substance sprayed from the nozzle 2 and solidified in the state adhering to the particles are recovered from the product discharge opening 14 as particles including product particles.

The gas fed under pressure from the gas feed pipe 5 and rising in the granulator 13 is transported through the gas discharge pipe 17 to a device (not shown) for separating and collecting dusts.

Parts of coarsened particles jetted and scattered from the jet layer 3 fall on the collecting means 101, 102 and 103 and only excessive size particles are selectively collected by these collecting means, while other particles pass through the collecting means and are returned to the inverted frustoconical portion 7.

Excessive size particles are deposited and accumulated on the collecting means 101.

If desired, a hand hole provided with a door may be disposed on the cylindrical portion 15 in the vicinity of the collecting means 101 so that excessive size particles deposited on the collecting means 101 are removed through this hand hole by an operator optionally while the granulator is operated.

Excessive size particles collected on the collecting means 102 and 103 are discharged through the opening 104 and product discharge opening 14, respectively.

FIG. 8 is a perspective view illustrating several examples of the collecting means to be used in the present invention.

In each example, the hatched portion is an opening formed through the inner cylinder 15. As pointed out hereinbefore, such opening is a product discharge opening or an opening for discharging excessive size particles exclusively.

Any of the structures shown in FIG. 8 can be used for the collecting means 101, 102 and 103. But that of FIG. 9 is used only as the collecting means 101.

Since the frequency of formation of excessive size particles or agglomerates is relatively low during ordinary operation, even if excessive size particles are kept in a state deposited on the collecting means 101, the granulator can be operated continuously for a long time. However, if an opening and closing door is disposed on the hatched portion shown in FIG. 8 and the deposited excessive size particles are removed through this hatched portion as a hand hole by an operator at an optional time, reduction of the collecting capacity is not brought about in the collecting means.

Figure 9A:
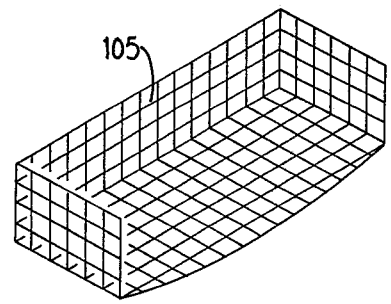
Figure 9B:
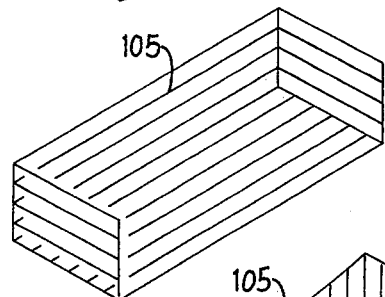
Figure 9C:
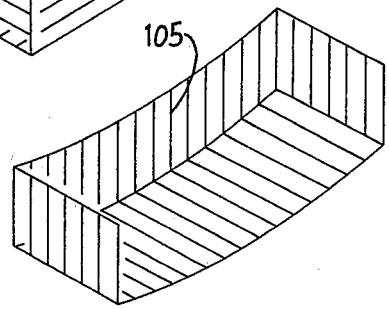

Examples of the structure suitable for the collecting means 101 are shown in FIG. 9. In FIG. 7, the hand hole is omitted.

The most characteristic feature of the apparatus of the present invention is that the ratio of removal of excessive size particles is very high though the structure is very simple.

The reason why such high recovery ratio is attained in the present invention is that since passage through the jet layer and upward scattering should be repeated scores of times to hundreds of times in order for seed particles to grow into coarsened particles, even if the horizontal projection length of collecting means projecting inward in the granulator is considerably smaller than the inner diameter of the granulator, the probability that excessive size particles are collected before they grow into large agglomerates hardly capable of being scattered from the jet layer is very high.

When the granulator of the present invention is employed, the granulating action of the jet layer is stabilized and the operation can easily be performed so that the average particle size of particles in the inverted frustoconical portion 7 is increased, whereby the granulation efficiency can remarkably be improved.

This improvement of the granulation efficiency results in improvements of operation efficiencies of equipments attached to the jet layer granulator, such as a particle classifying equipment.

(II) Fine particle treating means

Recently, the fluidized granulation method has attracted attention because of an advantage that the granulation operation can be accomplished promptly by a simple step. Especially for stabilizing fluidization, a jet layer type granulating apparatus is very effective. In the granulating apparatus of this type, a collecting device is disposed in a granulator or outside the granulator to treat scattered fine particles carried by discharged air, and the collected fine particles are returned to the step preceding the granulator or a melting device by the collecting device. However, if such fine particle-returning method is adopted, the size of the granulating apparatus is increased to such an extent as corresponding to the quantity of collected fine particles and the steam consumption is drastically increased, with the result that the inherent advantage of the jet layer granulating apparatus, that is, the advantage that large quantities of granulation products can be obtained by a small-scale apparatus, is lost. Furthermore, the method in which the collected fine particles are returned to the melting device cannot be applied when return of fine particles is not allowed because of maintenance of the quality of the product. For example, in case of granulation of urea, if fine particles are returned to the melting device biuret is formed by heating for melting, and when a urea fertilizer containing biuret is applied to the soil, bad influences are given to plants by biuret. Moreover, the steam consumption is increased because of re-melting.

The additional invention (II) is to solve the foregoing problems involved in the above-mentioned conventional methods, and provides a granulating apparatus of the jet layer type in which by feeding collected fine particles to the jet layer zone together with air, the fine particles are caused, together with the melt sprayed to the surfaces of small particles, to adhere to the small particles, whereby coarsening of the small particles and treatment of the collected fine particles can simultaneously be accomplished.

Figure 10:
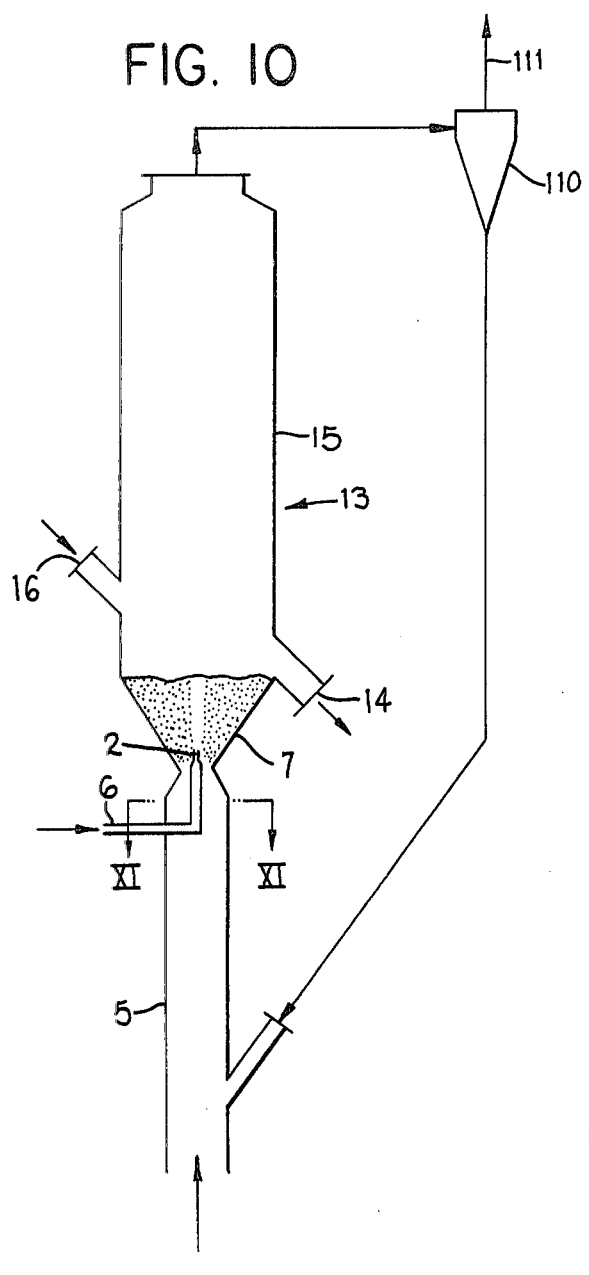
FIG. 10 is a view diagrammatically illustrating the apparatus of the additional invention (II)

The additional invention (II) will now be described with reference to embodiments illustrated in FIGS. 10 to 12. A granulator proper 13 comprises a lower inverted frustoconical portion 7 and an upper cylindrical portion 15. An air feed pipe 5 is connected to the inverted frustoconical portion 7 and communicated with the interior of the granulator proper. At the center of the lower part of the inverted frustoconical portion 7, a nozzle 2 is arranged upward on the top end of a melt feed pipe 6. An opening 16 for charging small particles acting as nuclei of granulated particles is disposed in the lower part of the cylindrical portion 15, and a product withdrawal opening 14 is formed on the top end of the inverted frustoconical portion 7. A cyclone 110 is attached to the granulator 13 in a gas discharge passage as collecting means, so that fine particles scattered from the granulator 13 are separated and collected. The collected fine particles are introduced into the air feed pipe 5 and carried by an air stream. Reference numeral 111 represents a stream of air discharged from the cyclone 110.

In the granulating apparatus having the above-mentioned structure, the melt sprayed from the nozzle 2 is coated on the surfaces of small particles, and simultaneously, the small particles are jetted and fluidized by air fed under pressure. The small particles which are in the fluidized state and coated with the sprayed melt are coarsened because fine particles fed from the cyclone 110 together with air adhere to the surfaces of the small particles. Particles containing product particles having a predetermined particle size overflow from the upper portion of the particle layer in the inverted frustoconical portion 7 and are discharged from the withdrawal opening 14.

Figure 11:
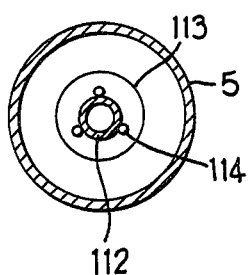
FIGS. 11 and 12 are views showing the section taken along line II—II in FIG. 10, which illustrate structures suitable for preventing fine particles from adhering to the melt feed pipe 12.
Figure 12:
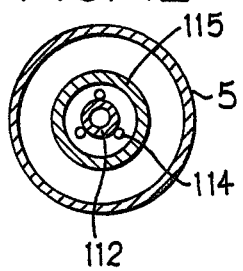

FIGS. 11 and 12 show structures suitable for preventing fine particles collected and introduced in the air feed pipe 5 from adhering to the melt feed pipe 6.

In the structure shown in FIG. 11, a melt feed pipe 112 is concentrically inserted in a heat-insulating air pipe 113, and a predetermined number of heating pipes 114 for flowing of steam as a heating medium are disposed outside the peripheral wall of the pipe 112.

In the structure shown in FIG. 12, a heat-insulating partition wall 115 is provided instead of the heat-insulating air pipe 113 shown in FIG. 11.

In the structures shown in FIGS. 11 and 12, even if fine particles pass through the air feed pipe 5, since the interior of the pipe 113 or 115 is maintained at a relatively low temperature, adhesion of the collected fine particles on the outer surface of the pipe is prevented.

In the foregoing embodiment, a member having a corresponding collecting function, such as a bag filter, may be used as the collecting device instead of the cyclone. Moreover, the collecting device may be disposed in the interior of the granulator 13. Furthermore, the positions for charging the small particles and discharging product particles are not limited to those shown in FIG. 13.

As will be apparent from the foregoing description, in the present invention, since collected fine particles are fed together with air into the jet layer and the granulating effect is attained by these fine particles as well as the sprayed melt, coarsening of small particles is promoted by the collected fine particles. Furthermore, the collected particles need not be returned to the preceding step or the melting device. Accordingly, the collected fine particles can be treated reasonably. Moreover, the size of the granulating apparatus can effectively be diminished, and a high quality can be guaranteed for the product. These effects cannot be attained by returning the collected fine particles to the particle layer in the reverse frustoconical portion 7. The reason is that in this case, the fine particles flow directly in the cyclone 110. It is important that the collected fine particles should be returned to the air feed pipe 5.

(III) Rectifying pipe member

In granulators, it is important how to form a good jet layer. Overflowing of products in the apparatuses will now be described. In the apparatuses, an overflowing opening (discharge opening) is ordinarily formed in a small area in the upper portion of the apparatus, and therefore, a chance of discharge of coarsened particles having a desirable particle size is very small and excessively coarsened particles are readily formed. When such excessively coarsened particles are formed, it is very difficult to further continue the operation. As means for eliminating this disadvantage, there has been proposed an entire circumference withdrawal method in which the entire circumferential edge of a top opening of a conical portion is used as a discharge opening and particles are allowed to overflow from this discharge opening. When experiments were made on this entire circumference withdrawal method, it was found that if the jet air speed (air feed rate) is increased, the proportion of small particles having a particle size smaller than the desirable particle size, which scatter away and flow out of the conical portion, is increased and the amount of particles contained in the conical portion is decreased, with the result that the treatment capacity of the apparatus is reduced. It also was found that if the air feed rate is further increased, no particles are resident in the conical portion and it becomes impossible to form a jet layer having a good particle density, and that if the air feed rate is reduced, the treatment capacity of the apparatus is decreased and the granulation efficiency is reduced. Accordingly, adjustment of the air speed at the lower end part of the portion 120 shown in FIG. 13 becomes extremely delicate and the air speed range for an optimum operation is very narrow. In addition to these difficulties inherent of the entire circumference withdrawal method, there are difficulties generally encountered in the jet layer granulation. For example, in the ordinary jet layer granulation, if the flow condition in the lower portion of the granulator is not good, it is impossible to form a good jet layer. Furthermore, a highly experienced skill is necessary to form a jet layer at the start of the operation.

The additional invention (III) has been completed as the result of researches made with a view to eliminating the foregoing defects and disadvantages, and therefore provides a jet layer type granulating apparatus in which a good jet layer is formed to increase the treatment capacity of the granulator and improve the granulation efficiency.

Figure 13:
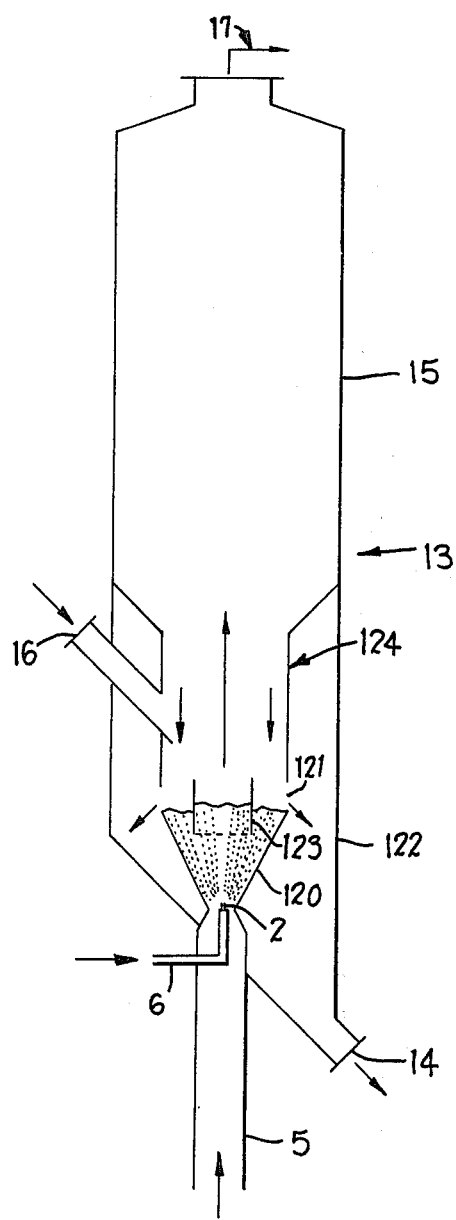
FIG. 13 is a longitudinal sectional view diagrammatically illustrating an embodiment of the granulating apparatus according to the additional invention (III).

The additional invention (III) will now be described with reference to an embodiment shown in FIG. 13. Reference numeral 13 represents a granulator, and a conical portion 120 of an inverted frustoconical vessel is formed below a cylindrical portion 15 of the granulator 13. The cylindrical portion 124 is spaced from the conical portion 120, whereby an overflow opening 121 is formed on the entire circumferential edge of a top opening of the conical portion 120. An air jet pipe 5 (hereinafter referred to as "jet air feed pipe" or "air feed pipe") is communicated with the lower part of the conical portion 120. At the lower narrowed part of the conical portion 120, a jet nozzle 2 of a melt supply pipe 6 is arranged upward. Reference numeral 16 represents a circulated particle charge opening for feeding seed particles to be coarsened or small particles which are to be fed to the granulator again because the particle size does not reach a desirable particle size. This charge opening 16 is disposed at the lower part of the cylindrical portion 15 to face the upper part of the conical portion 120. The lower part of the cylindrical portion 15 and the peripheral part of the conical portion 120 are covered with a guide chute 122. The lower portion of the chute 122 is formed into a product particle discharge opening 14. Reference numeral 17 represents an air discharge opening.

A rectifying pipe member 123 formed of stainless steel is disposed at the central part of the upper zone of the conical portion 120. The lower end face of the rectifying pipe member 123 is separated from the wall surface of the conical portion 120, and also the peripheral wall surface of the rectifying pipe member 123 is separated from the wall surface of the conical portion 120. The rectifying pipe member 123 is supported by an appropriate number of supporting rods (not shown) extending between the rectifying pipe member 123 and the conical portion 120. The rectifying pipe member 123 may be suspended from the cylindrical portion 15 through appropriate supporting rods.

In the apparatus having the above-mentioned structure, small particles fed as nuclei to the conical portion 120 from the opening 16 are jetted up and fluidized by jet stream fed through the air feed pipe 5, and a melt jetted and sprayed from the nozzle 2 is coated on the surfaces of the small particles being fluidized and the coated melt is solidified or dried to effect granulation. Most of the jetted particles pass through the interior of the rectifying pipe member 123, rise substantially along the central axis to the upper part of the cylindrical portion 15, fall down along the peripheral wall of the cylindrical portion 15 and are then returned to the jet layer of the conical portion 120. During this travel, granulation is effected.

When the rectifying pipe member 123 is especially disposed according to the present invention, the feed rate of air fed from the air feed pipe 5 can be remarkably increased. For example, even if a high air speed of about 30 m/sec is maintained at the lower end of the conical portion 120, the small particles are not caused to scatter and flow out of the overflow opening 121. The reason is that the propelling force for jetting up the particles are concentrated to the central part of the conical portion 120 by the rectifying pipe member 123 and has no influence on the particle layer in the peripheral zone of the conical portion 120. Namely, the rectifying pipe member 123 exerts functions of maintaining the jet layer, protecting scattering of small particles and preventing flow-out of particles through the overflow opening 121.

As is seen from the foregoing description, according to the additional invention (III), even if the air feed rate is increased, small particles are prevented from flowing out, and therefore, it is possible to increase the treatment capacity of the granulator and improve the granulation efficiency. Furthermore, the amount of particles resident in the conical portion 120 is stabilized and the operation load range can be expanded. Moreover, since overflowing particles are withdrawn according to the entire circumference withdrawal method, formation of excessively coarsed particles, which inevitably occurs in the conventional partial withdrawal method, can be prevented assuredly. Still further, if the rectifying pipe member 123 is provided, particles are stably resident in the conical portion 120 at the start of the operation, and starting of the granulator can remarkably be facilitated. Still in addition, even if the state of the air stream for formation of the jet layer is somewhat unstable, a jet layer can be formed. These are effects and advantages attained by the present invention.

In the foregoing embodiment, the rectifying pipe member 123 uniform in the diameter is vertically disposed. In the present invention, however, good effects can similarly be obtained when a pipe member having an upwardly expanded or downwardly expanded shape is used. The diameter and height of the pipe member 123 may appropriately be changed according to the particles to be treated and the operation conditions. Moreover, the pipe member 123 may be constructed by unit pipe segments so that the diameter of the pipe member is changed. With respect to the location height of the pipe member 123, it is preferred that the position of the top end of the pipe member 123 be higher than the position of the overflow opening 121.

As will readily be understood from the foregoing description, the additional invention (III) is characterized in that the entire circumference withdrawal method is combined with a special disposition of the rectifying pipe member, and by virtue of this characteristic feature, there can be attained prominent effects of increasing the treatment capacity of the granulator, smoothly withdrawing particles having a very high content of particles having a desirable particle size, forming and maintaining a good jet layer and improving the controllability of the operation conditions.

(IV) Buffer member

Particularly, the additional invention (IV) relates to an apparatus utilizing a jet layer in which a buffer member capable of inhibiting rising of jetted particles and allowing the particles to fall down without breakage of the particles is disposed in a space above the jet layer.

In an apparatus utilizing a jet layer, particles resident in the apparatus are jetted and fluidized by a high speed gas fed from below under pressure through a gas feed pipe. From the experiments made by us, it has been confirmed that since the speed of the particles jetted in such apparatus is considerably high, if a considerable space is not provided above the jet layer, particles are unnecessarily and wastefully discharged together with the gas or the jetted particles impinge against the upper wall of the jet layer apparatus to cause breakage of the particles, with the result that attainment of the intended object, such as granulation, is not accomplished. Furthermore, if particles are unnecessarily and wastefully discharged by the gas, a device for collecting the discharged particles should additionally be disposed. If the jetted particles are violently broken in large quantities, the inherent function of the jet layer apparatus is not exerted at all. Accordingly, in the apparatus, there is adopted a method in which the rising speed of jetted particles is reduced by increasing the column height of the jet layer apparatus or increasing the diameter of the column. However, if such method is adopted, the construction cost is drastically increased.

We made researches with a view to developing a method capable of inhibiting rising of jetted particles without adopting such means as increasing the column height and allowing the particles to fall down without breakage of the particles, and we found that this object can be attained by disposing a hindrance member having a buffer effect in a space above the jet layer. We have now completed the additional invention (IV) based on this finding.

More specifically, there is provided an apparatus utilizing a jet layer in which a fluidized state of particles is maintained by a stream of a gas fed from below under pressure through a gas feed pipe, said apparatus being characterized in that a buffer member capable of inhibiting rising of jetted particles and allowing the particles to fall down without breakage of the particles is disposed in a space above the jet layer.

In the additional invention (IV), by disposing a hindrance member having a buffer effect in a space above the jet layer, the kinetic energy of jetted particles is absorbed by contact with this buffer member and the particles are caused to rebound in a manner quite similar to natural falling, with the result that the particles are allowed to fall down without breakage and the height of the jet layer apparatus can be decreased.

As the buffer member to be disposed in a space above the jet layer, there can be used any of members capable of inhibiting rising of jetted particles and allowing the particles to fall down without breakage. It also is important that dusts formed from the jet layer should not adhere to the buffer member or should not be accumulated on the buffer member. If dusts or the like going to adhere to the buffer member are readily deformed, for example, bent, by application of an external force or because of the weight of adhering substances, adhesion can be prevented. This purpose can easily be attained by selecting a material having an appropriate surface roughness as the buffer member or appropriately adjusting the inclination angle of the surface on which dusts or the like are apt to be deposited. Furthermore, there may be adopted such means as means for giving vibrations to the buffer member and means for changing the surface area of the buffer member.

A preferred example of the hindrance member having a buffer effect, which is disposed in a space above the jet layer, will now be described. A buffer member having a conical structure in which the expansion angle is preferably 80° to 120° is used so as to prevent accumulation of dusts or the like, and a member which does not break jetted particles when they impinge against the member and allows the particles to rebound without adhesion, such as a plate or fabric member, preferably a fabric sheet, is stretched on the bottom surface of the conical buffer member. The kind of the fabric sheet is appropriately chosen according to the intended use of the jet layer, but a fabric sheet excellent in the strength, high temperature resistance and moisture absorption resistance is ordinarily preferred. For example, a fabric sheet formed of polypropylene is preferably used. When a plate on which a member having a buffer effect is stretched is used instead of the above-mentioned conical member, vibrations may be given so as to prevent adhesion, or there may be adopted a balloon-like member having a nonadhering surface, in which a pressurized gas is filled. In such buffer member, the degree of the buffer effect can appropriately be changed according to the properties of particles to be jetted.

Figure 14:
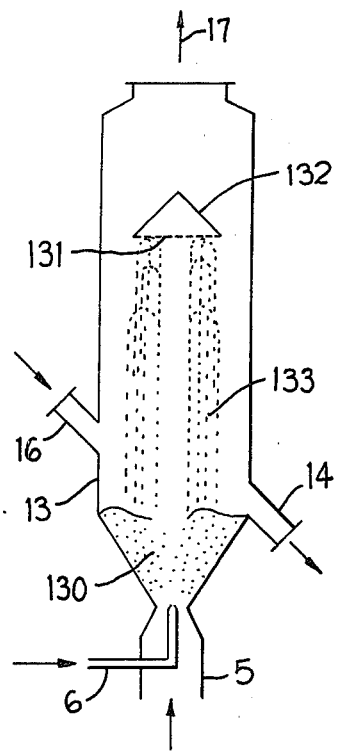
FIG. 14 is a view diagrammatically illustrating the longitudinal section of a jet layer granulator to which one embodiment of the jet layer-utilizing apparatus of the additional invention (IV) is applied.

The additional invention (IV) will now be described with reference to the accompanying drawings. FIG. 14 is a view diagrammatically illustrating the longitudinal section of a jet layer granulator to which one embodiment of the jet layer-utilizing apparatus of the present invention is applied. In this jet layer granulator 13, particles of a particle layer 130 are fluidized by a high speed gas fed under pressure from a gas feed pipe 5 and jetted upward. A liquid of a substance covering or coarsening the particles is sprayed from a nozzle or the like through a liquid feed pipe 6 to cause the liquid to adhere to the fluidized particles and to effect solidification of the liquid, whereby granulation is accomplished. If the granulated particles are jetted by the high speed gas, they are brought into contact with a buffer member, that is, a fabric sheet 131 stretched on a conical hindrance member 132, whereby rising of the particles is prevented and the particles are allowed to fall down without breakage. Accordingly, the height of the apparatus can be decreased without reduction of the inherent function of the granulation apparatus. The conical hindrance member 132 ordinarily has an expansion angle of 80° to 120°, for example, 90° and it has a certain inclination. Accordingly, accumulation of dusts formed from the jet layer can be prevented. Small particles as seed particles to be covered or coarsened are ordinarily supplied from a circulated particle feed inlet 16, and the granulation product is discharged from a granulation product withdrawal opening 14. The gas which has passed through the jet layer is discharged from a gas discharge opening 17. In the above-mentioned embodiment, one bottom having a reverse frustoconical shape is disposed. The additional invention (IV) may be applied to a jet layer-utilizing apparatus in which a plurality of bottoms having a reverse frustoconical shape are formed.

In the apparatus utilizing a jet layer, in order to prevent breakage of jetted particles by impingement against the apparatus wall, the column height of the apparatus should inevitably be increased. In contrast, in the jet layer-utilizing apparatus of the present invention, as is apparent from the foregoing description, since the hindrance member having a buffer effect is disposed in a space above the jet layer, the column height of the jet layer apparatus can be decreased and loss of particles of the jet layer by the gas is not brought about. Accordingly, expenses required for basic and supporting constructions of the apparatus can be reduced with reduction of the column height and loss of the substance of the jet layer can drastically be reduced. Therefore, great economical advantages can be attained by the present invention.

The additional invention (IV) will now be described in detail with reference to the following Examples.

In this Example, an embodiment in which the apparatus of the present invention was applied to a jet layer granulator for granulation of urea is described while comparing the embodiment with the run using the granulation apparatus.

In each run, a granulator having an inner diameter of 900 mm was used, and the operation conditions were an air feed rate of about 3000 Nm³/hr, a urea solution feed rate of about 1200 Kg/hr, a urea concentration of 97% by weight, a jet layer temperature of 80° C. and a circulation amount/liquid feed amount ratio of 1.0 to 1.2.

(1) The distance between the level of stationary particles and the ceiling of the apparatus was adjusted to 2700 mm. The particle size distribution of the granulation product obtained was such that particles having a size of 6 to 16 mesh occupied 71.9% by weight of the entire particles and particles having a size smaller than 16 mesh occupied 27.9% by weight of the entire particles. Thus, it was confirmed that the granulation product contained large quantities of fine particles presumably formed by breakage. At this experiment, small particles were discharged at a rate of 250 Kg/hr together with the gas from the gas discharge opening 7 disposed in the top portion of the jet layer apparatus.

(2) The height of the ceiling of the apparatus was increased so that the distance between the level of stationary particles and the ceiling of the apparatus was 6200 mm. The particle size distribution of the granulation product obtained was such that particles having a size of 6 to 16 mesh occupied 84.3% by weight of the entire particles and particles having a size smaller than 16 mesh occupied 14.9% by weight of the entire particles. Thus, the proportion of small particles was decreased. At this experiment, small particles were discharged at a rate of 110 Kg/hr from the gas discharge opening 17.

(3) The buffer member according to the present invention was disposed at a height of 3200 mm from the level of stationary particles, and the distance between the level of stationary particles and the ceiling of the apparatus was adjusted to 4000 mm. A conical member having an expansion angle of 90° was disposed as the buffer member so that the apex of the conical member was located on the upper side, and a fabric sheet formed of a polypropylene type resin was stretched on the bottom surface of the conical member. The particle size distribution of the granulation product obtained was such that particles having a size of 6 to 16 mesh occupied 85.9% by weight of the entire particles and particles having a size smaller than 13.0% by weight of the entire particles. At this experiment, small particles were discharged at a rate of 100 Kg/hr from the gas discharge opening 17.

(4) A rubber sheet-stretched plate provided with a vibrator for prevention of adhesion was used as the buffer member instead of the fabric sheet-stretched conical member. The particle size distribution of the granulation product obtained was such that particles having a size of 6 to 16 mesh occupied 85.6% by weight of the entire particles and particles having a size smaller than 16 mesh occupied 14.9% by weight of the entire particles. At this experiment, small particles were discharged at a rate of about 100 Kg/hr from the gas discharge opening 17.

In another Example, an embodiment in which the apparatus of the present invention was applied to a jet layer sulfur-coating apparatus is described while comparing this embodiment with the run using the conventional coating apparatus.

A coating apparatus having an inner diameter of 300 mm was used. Urea granules were coated with sulfur under conditions of an air feed rate of 580 Nm³/hr a sulfur solution feed rate of 300 Kg/hr and a circulated urea granule amount/feed solution amount ratio of 0.3 to 0.7. The sulfur-coated urea granules had a hardness slightly higher than that of the uncoated urea granules. If the distance between the level of the stational particle layer and the ceiling of the apparatus was smaller than 3000 mm, the proportion of broken fine particles was increased. Accordingly, a conical member of the buffer member of the present invention was disposed at a height of 2600 mm from the level of the stationary particle layer and a sheet of a polypropylene type resin was stretched on the bottom surface of the conical member in the same manner as described in the foregoing Example. A good effect was attained and peeling of the sulfur coating was not observed in the apparatus.

(V) Hindrance and breakage member

In the additional invention (V) at least a part of particles jetted above a jet layer are caused to impinge against a hindrance member disposed in a space above the jet layer and are thus broken, and the resulting small particles are used as seed particles necessary for the jet layer granulation.

According to the jet layer granulation technique, there is ordinarily adopted a method in which small particles as seed particles are jetted and fluidized by a gas and a liquid of a substance for covering or coarsening the particles is sprayed from a nozzle or the like to effect granulation. As in case of other granulation method such as rolling granulation or fluidized layer granulation, small particles as seed particles are supplied from the step of the post treatment of granulated particles withdrawn from the jet layer granulator, by using a circulation system. This circulation system comprises not only various transporting devices for transporting small particles, such as a bucket elevator and a belt conveyor but also a device for separating the product from small particles by sieving, a pulverizer for forming small particles when the quantity of small particles is insufficient and a device for treating dusts discharged from the circulation system for preventing environmental pollution. In this ordinary jet layer granulation method, the cooling effect by a gas supplied in a large quantity for jetting and fluidizing particles is much higher than in other granulation methods in which the quantity of small particles fed by the circulation system has great influences on the heat balance in the granulator, such as the pan rolling granulation method or drum rolling granulation method, and from the viewpoint of the heat economy, it has been desired to reduce the quantity of small particles to be circulated.

We made researches with a view to reducing the quantity of small particles to be circulated in the above-mentioned jet layer granulation method, and as the result, we found that when a hindrance member is disposed in a space above a jet layer, parts of particles jetted together with a gas are caused to impinge against the hindrance member and are broken and small particles that can be used as seed particles are formed. We furthered our researches and found that the intended object can be attained if the jetted particles are caused to impinge against the hindrance member at a speed sufficient to cause a breakage phenomenon. We have now completed the additional invention (V) based on these findings.

More specifically, there is provided a jet layer granulation method characterized in that at least a part of particles jetted above a jet layer are caused to impinge against a hindrance member disposed in a space above the jet layer and the resulting small particles formed by breakage at the impingement are used as a part or all of necessary seed particles.

In the jet layer granulation method, it is known that the particle size distribution of the granulation product from the withdrawal opening of the granulator can be controlled according to the particle size distribution of small particles as seed particles to be fed through the circulation system. By controlling the degree of breakage by the hindrance member disposed in a space above the jet layer, the particle size distribution of the granulation product from the withdrawal opening of the granulator can be controlled.

In a jet layer granulator used for carrying out the present invention, particles in a particle layer in a vessel having an inverted frustoconical bottom are fluidized by a high speed gas jetted upward under pressure from a gas feed pipe opened to the vessel bottom, a liquid substance which is solidified by cooling, heating or drying is sprayed to particles being fluidized and the particles are coarsened by adhesion and solidification of the sprayed liquid substance, and a hindrance member is disposed in a space above the jet layer in such ordinary jet layer granulator.

Any of members capable of forming small particles as seed particles necessary for jet layer granulation by breaking a part of particles impinging against the members can be used as the hindrance member to be disposed in a space above the jet layer. In brief, a plate-like collision member, a net-like collision member or a shaped member having a certain or indefinite shape can be disposed as the hindrance member in a space above the jet layer. Such hindrance member may be arranged to have a vertically movable structure for adjusting the collision shock on impingement of the upward jetted particles against the hindrance member, or the hindrance member may be arranged so that the surface area can be changed, for example, by changing the inclination angle of a collision plate to change the proportion of particles impinging against the hindrance member. The particle size and quantity of small particles formed by breakage can freely be adjusted by combining these arrangements appropriately. Moreover, needles or other projections may be formed on the surface of the hindrance member so that breakage of impinging particles is facilitated, or a coarse surface may be formed on the hindrance member so that adhesion of particles is prevented. Furthermore, a structure capable of giving rotations, vibrations or deformations may be applied to the hindrance member.

The collision force necessary for breaking particles jetted above the jet layer and impinging against the hindrance member varies depending on the properties and conditions of the starting particles and intended granulation product, such as hardness, compressive strength, pulverizing capacity, water content and temperature condition. Ordinarily, a gas jet speed sufficient to form a jet layer is at least 10 m/sec, and this gas jet speed is preferably 20 to 35 m/sec. The moving speed of particles on impingement against the hindrance member is 10 to 30 m/sec.

The granulation product which has come to have a desired particle size in the jet layer granulation method of the present invention is withdrawn from the granulator according to customary procedures. In this embodiment, small particles formed by breakage on impingement against the hindrance member are used as all of necessary seed particles, and this embodiment is especially preferred when the desired particle size distribution is broad. In another embodiment, the granulation product formed by the jet layer granulation is withdrawn from the jet layer granulator, a relatively small quantity of small particles having a size smaller than the desired size are separated by sieving or the like, and the separated small particles are used as a part of seed particles and circulated to the jet granulator used in the present invention. If a sieving mechanism is disposed on the withdrawal opening of the granulator, the particle size distribution of the granulation product can be controlled.

Figure 15:
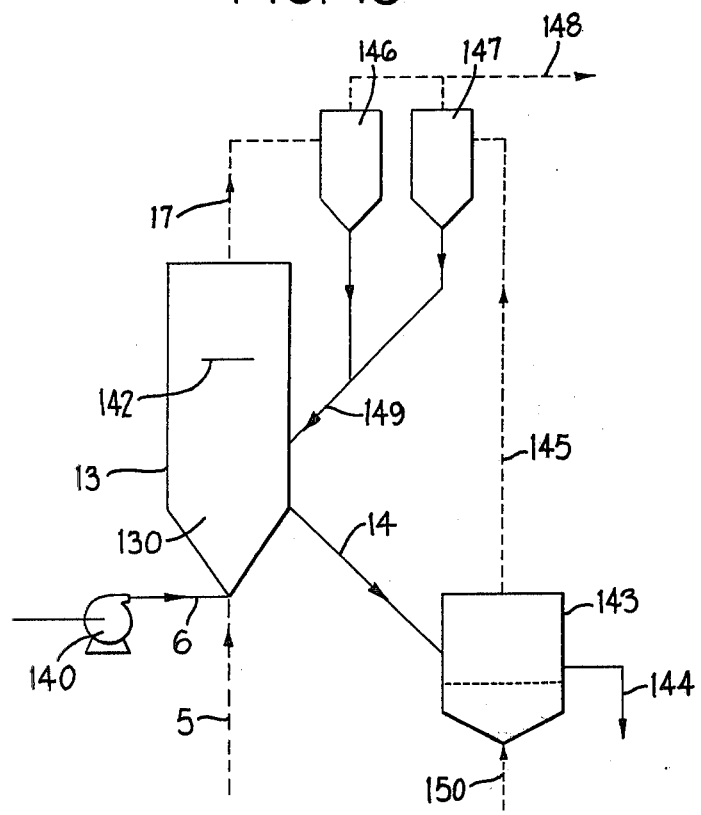
FIG. 15 is a flow sheet showing one embodiment of the jet layer granulation method according to the additional invention (V).
Figure 16:
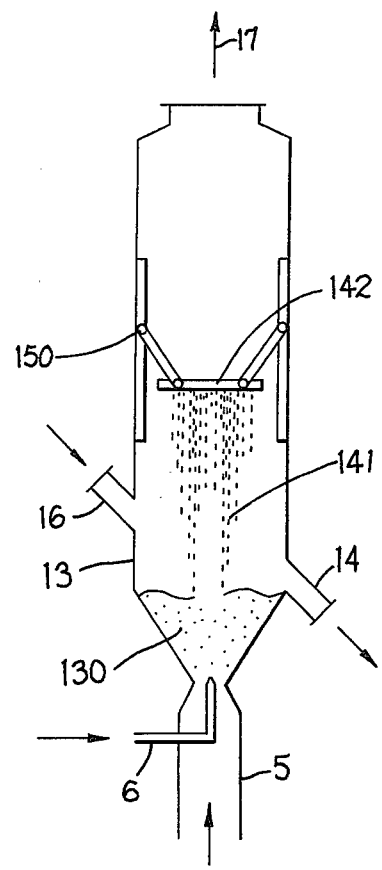
FIG. 16 is a view diagrammatically illustrating the longitudinal section of the main part of one embodiment of a jet layer granulator preferably used for carrying out the jet layer granulation method according to the additional invention (V).

The additional invention (V) will now be described with reference to FIGS. 15 and 16. FIG. 15 is a flow sheet illustrating one embodiment of the jet layer granulation method of the present invention. FIG. 16 is a view diagrammatically illustrating the longitudinal section of one embodiment of the jet layer granulator that is preferably used for carrying out the method of the present invention. In a jet layer granulator 13, particles of a particle layer 130 are fluidized by a high speed gas jetted upward under pressure from a gas feed pipe 5. A liquid of a coating or coarsening substance is sprayed to the fluidized particles from a nozzle or the like through a feed pump 140 and a feed pipe 6, and the liquid adheres to the fluidized particles and is solidified thereon to effect granulation. During this granulation, a part of jetted particles 141 (shown in FIG. 16) are broken by a hindrance member 142 disposed in a space above the jet layer, and the resulting small particles are used as seed particles. The particle size and quantity of the small particles formed by breakage are controlled by a hindrance member displacing mechanism (shown in FIG. 16), whereby the particle size distribution of the granulation product from a withdrawal opening 14 of the granulator can be controlled within a desirable range. The obtained granulation product is cooled by a cooling device 143 or the like and is recovered as a product 144. The fed gas is passed through gas discharge openings 17 and 145 and small particles contained in the gas are recovered at cyclones 146 and 147. The uncollected small particles are fed to a dust recovery device through a conduit 148. The recovered small particles are ordinarily circulated to the jet layer granulator 13 from a circulated particle feed opening 149. In FIG. 16, the mechanism for changing the vertical position of the hindrance member is illustrated in detail. In the jet layer granulator shown in FIG. 16, one jetting portion is formed. However, the additional invention (V) may be applied to a jet layer granulator including a plurality of jetting portions are formed, and also in this case, the intended object of the present invention can similarly be attained.

When a granulation plant is constructed by utilizing the conventional granulation method in which supply of small particles as seed particles is necessary, such as the pan rolling granulation method, the drum rolling granulation method, the fluidized bed granulation method or the stirring granulation method, very large expenses are required for construction of a circulation system. In contrast, according to the present invention, as will be apparent from the foregoing description, by disposing a hindrance member as described hereinbefore in a space above the jet layer, it becomes unnecessary to provide such circulation system, or the scale of such circulation system can remarkably be diminished. Accordingly, the jet layer granulation method of the present invention is very suitable for obtaining granulation products by jetting seed particles of a granulator product such as urea, ammonium sulfate, a chemical fertilizer or sulfur, causing a solution or melt of a chemical substance which is the same as or different from the substance of seed particles to adhere to the seed particles and solidifying the adhering solution or melt by cooling or drying to obtain coarsened particles.

The present invention will now be described in detail with reference to the following Example and Comparative Example.

This Example illustrates an embodiment in which the method of the additional invention (V) was applied to jet layer granulation of urea.

In a granulator having an inner diameter of 900 mm, a plate-like hindrance member was disposed at a height of 2000 mm from the level of a stationary particle layer, and granulation was carried out at an air feed rate of 2844 Nm$^3$/hr and a jet layer inner temperature of 80° C. while a urea solution having a concentration of 97% by weight was fed at a rate of 767 Kg/hr. Only the small particles recovered at cyclones were circulated, and the circulation rate was 54 Kg/hr. The particle size distribution of the obtained granulation product was as shown in Table 1.

TABLE 1

| Tyler Mesh | Content (% by weight) |
| --- | --- |
| + 6 | 3.8 |
| − 6 ~ + 8 | 13.3 |
| − 8 ~ + 10 | 33.7 |
| − 10 ~ + 12 | 31.2 |
| − 12 ~ + 16 | 11.0 |
| − 16 | 7.0 |

As a comparison, the hindrance member for breaking particles, disposed in the space above the jet layer in the granulator used in the foregoing example, was removed. In the resulting jet layer granulator, urea was granulated. The air feed rate was 2542 Nm³/hr and the liquid feed rate was 755 Kg/hr and they were not substantially different from those in the Example, but it was necessary to circulate small particles at a rate of 768 Kg/hr. The particle size distribution of the obtained granulation product was as shown in Table 2.

TABLE 2

| Tyler Mesh | Content (% by weight) |
| --- | --- |
| + 6 | 0.8 |
| − 6 ~ + 8 | 9.2 |
| − 8 ~ + 10 | 28.1 |
| − 10 ~ + 12 | 49.7 |
| − 12 ~ + 16 | 10.2 |
| − 16 | 2.0 |

From the results shown in Tables 1 and 2, it is seen that the particle size distribution of the granulation product obtained in the Example is slightly broader than the particle size distribution of the granulation product obtained in the Comparison. However, such difference is of no significance from the practical viewpoint. Accordingly, it has been confirmed that according to the method of the present invention, the circulation system can be omitted.

Figure 17:
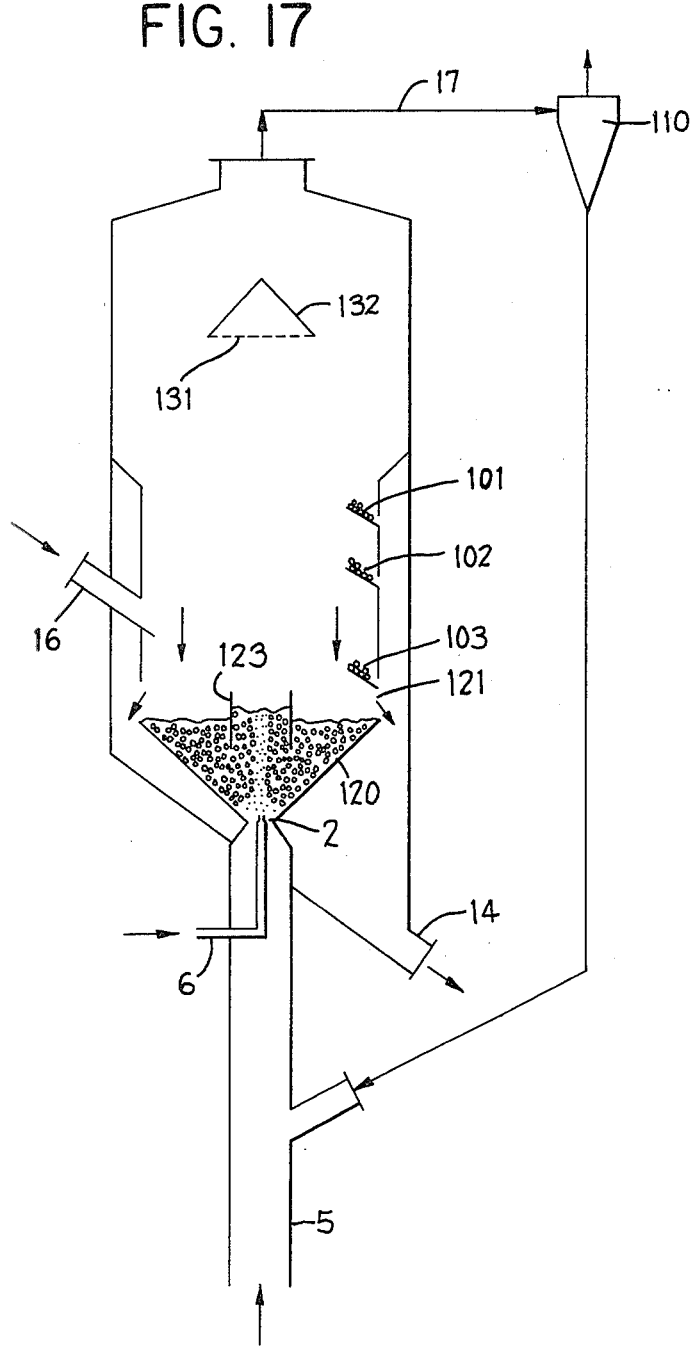
FIG. 17 is a longitudinal sectional view illustrating an embodiment of the present invention in which all preferable features are incorporated.

An embodiment containing all the critical features and additional features (I) to (V) as defined before is illustrated in FIG. 17.

What is claimed is:

1. A granulator, comprising
an elongated, substantially vertical vessel having at its lower portion a downwardly converging funnel of inverted frusto-conical shape, said funnel being adapted to contain a bed of particles;
a gas-supply conduit extending outwardly from the bottom of said funnel, said gas-supply conduit defining a gas-jetting opening at its upper end which opening is coaxial with the central axis of said funnel, said conduit being adapted for supplying through said gas-jetting opening an upwardly flowing, high velocity stream of gas effective to entrain particles present in the lower portion of the bed so that the gas stream and particles entrained therein flow coaxially upwardly through said funnel and through the central portion of the bed into the central region of the upper portion of said vessel above the bed;
liquid-supply pipe means extending upwardly through the central portion of said gas-jetting opening, said supply pipe means having spraying means at its upper end for spraying droplets of liquid material upwardly into said funnel and through the path of said gas stream so that said liquid droplets contact and adhere to said particles in said funnel and enlarge the size thereof to form granules, said spraying means being disposed within said funnel above the upper end of said gas-jetting opening and being located a vertical distance above said gas-jetting opening which distance is less than the internal diameter of said gas-jetting opening.

2. A granulator as claimed in claim 1 in which the lower portion of the wall of said frusto-conical funnel defines a first included angle that is smaller than a second included angle that is defined by the wall of an imaginary inverted cone, the axis of which imaginary cone is coaxial with the central axis of said gas-jetting opening, the apex of which imaginary cone lies in said gas-jetting opening and wherein said second included angle is twice as large as the minimum angle of repose of the particles to be granulated, the intersection of the inner surface of said lower portion of the wall of said frusto-conical funnel with said imaginary cone defining an imaginary circle which is coaxial with said central axis of said gas-jetting opening and which circle has a diameter from 1.25 to 3.0 times as large as the diameter of said gas-jetting opening.

3. A granulator as claimed in claim 2 in which said gas-supply conduit extends upwardly a short distance above the lower edge of said funnel so that a thin layer of particles can accumulate in the region surrounding the portion of said gas-supply conduit that is above the lower edge of said funnel.

4. A granulator as claimed in claim 2 in which the upper portion of the wall of said funnel defines a third included angle which is smaller than said first included angle.

5. A granulator as claimed in claim 2 or claim 4 in which said funnel has a planar bottom wall coplanar with said gas-jetting opening so that a thin layer of particles can accumulate on said bottom wall surrounding said gas-jetting opening.

6. A granulator as claimed in claim 1, claim 2, claim 3 or claim 4 wherein said spraying means is constructed so that said droplets of liquid are sprayed into said funnel in an inverted conical pattern at an angle in the range of from 20° to 120° with respect to the vertical.

7. A granulator as claimed in claim 1, claim 2, claim 3 or claim 4 in which the wall of said frusto-conical funnel defines an included angle in the range of 40° to 120°.

8. A granulator as claimed in claim 6 in whch the wall of said frusto-conical funnel defines an included angle in the range of 40° to 120°.

9. A granulator as claimed in claim 1 in which said vessel has an outlet for discharging the granules and including sieve means mounted on the internal wall of said vessel in the upper portion thereof and projecting into said vessel above the lower edge of said outlet for collecting and retaining excessively large granules.

10. A granulator as claimed in claim 9 including opening means in the side wall of said vessel adjacent said sieve means so that excessively large granules retained by said sieve means can be removed from said vessel.

11. A granulator as claimed in claim 9 in which said sieve means includes a sieve disposed in the upper portion of said outlet.

12. A granulator as claimed in claim 1 including a passage at the upper end of said vessel for discharging gas therefrom, a device for collecting fine particles present in the gas discharged through said passage and means for feeding the collected fine particles into said gas-supply conduit for recycling said fine particles into said funnel.

13. A granulator as claimed in claim 1 including a vertical, rectifying pipe having its lower end disposed within and spaced from the walls of said funnel, said rectifying pipe being coaxial with and spaced vertically upwardly from said gas-jetting opening and disposed to encircle said upwardly flowing gas stream.

14. A granulator as claimed in claim 13 in which said rectifying pipe extends vertically upwardly above the upper end of said frusto-conical funnel.

15. A granulator as claimed in claim 1 including a buffer member disposed in the upper portion of the vessel and extending across said upwardly flowing gas stream for blocking further upward movement of the particles in said gas stream within said vessel and causing the particles to fall down into said funnel without breaking the particles.

16. A granulator as claimed in claim 15 wherein said buffer member is a hollow conical member, the apex of which is uppermost, the walls of said conical member defining an included angle of from 80° to 120°, and a fabric layer extending across said conical member at the base thereof.

17. A granulator as claimed in claim 1, including a baffle disposed in the upper portion of the vessel and extending thereacross so that particles entrained in said upwardly flowing gas stream impinge against said baffle and are broken thereby so as to fall down into the upper end of said funnel.

* * * * *